(12) United States Patent
Lee et al.

(10) Patent No.: US 9,124,180 B2
(45) Date of Patent: Sep. 1, 2015

(54) MULTIPLE RESONANT CONVERTER APPARATUS AND CONTROL METHOD

(75) Inventors: Tai Keung Lee, Ma On Shan (HK); Wing Ling Cheng, Taipo (HK); Xiao Fen Zhong, Shen Zhen (CN); Yi Cai, Shen Zhen (CN)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 803 days.

(21) Appl. No.: 13/420,078

(22) Filed: Mar. 14, 2012

(65) Prior Publication Data

US 2012/0236610 A1 Sep. 20, 2012

(30) Foreign Application Priority Data

Mar. 15, 2011 (CN) .......................... 2011 1 0061418

(51) Int. Cl.
*H02M 3/335* (2006.01)
*H02M 3/28* (2006.01)
*H02M 1/00* (2007.01)

(52) U.S. Cl.
CPC .......... *H02M 3/285* (2013.01); *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC .............. H02M 3/1584; H02M 3/285; H02M 2001/0058
USPC ........... 323/222, 224, 269, 72, 273, 274, 282, 323/284, 285, 286, 287, 288, 289, 290; 363/15, 16, 17, 65, 67, 68, 69, 70, 71, 363/72; 307/65, 66
See application file for complete search history.

(56) References Cited

U.S. PATENT DOCUMENTS

| 6,414,470 | B1 * | 7/2002 | Liu et al. ........................ 323/272 |
| 6,515,460 | B1 | 2/2003 | Farrenkopf |
| 6,803,750 | B2 | 10/2004 | Zhang |
| 7,205,752 | B2 * | 4/2007 | Jansen ........................ 323/272 |
| 7,589,511 | B2 * | 9/2009 | Dong et al. ................... 323/285 |
| 7,706,151 | B2 * | 4/2010 | Neidorff et al. ................... 363/9 |
| 7,777,460 | B2 * | 8/2010 | Schuellein .................... 323/272 |
| 2001/0038277 | A1 * | 11/2001 | Burstein et al. ............... 323/272 |
| 2004/0196679 | A1 * | 10/2004 | Apeland et al. ............... 363/132 |
| 2008/0197824 | A1 * | 8/2008 | Qiu et al. ........................ 323/272 |
| 2011/0025284 | A1 * | 2/2011 | Xu et al. ........................ 323/282 |
| 2011/0234191 | A1 * | 9/2011 | Yeon et al. .................... 323/285 |

* cited by examiner

*Primary Examiner* — Adolf Berhane
*Assistant Examiner* — Jye-June Lee
(74) *Attorney, Agent, or Firm* — Harness, Dickey & Pierce, P.L.C.

(57) ABSTRACT

A resonant converter apparatus includes a plurality of resonant converters connected in parallel, and a control module outputting a pulse width modulation (PWM) control signal to the resonant converters. The control module includes a voltage control loop and a circuit control loop. The voltage control loop compares the sensed output voltage with a predetermined reference voltage, and outputs a PWM control signal to one of the resonant converters so the output voltage of the one converter is equal to the predetermined reference voltage. The current control loop uses the sensed output current of the one converter as a reference current, compares the reference current with the sensed output current from each of the other resonant converters, generates a frequency adjusting variable, and calculates the individual PWM control signal for each of the other converters so the output currents of the plurality of converters are the same.

16 Claims, 6 Drawing Sheets

MULTIPLE RESONANT CONVERTER APPARATUS AND CONTROL METHOD

CROSS-REFERENCE TO RELATED APPLICATION

This application claims the benefit and priority of Chinese Patent Application No. 201110061418.X filed Mar. 15, 2011, the entire disclosure of which is incorporated herein by reference.

FIELD

The present disclosure relates to a resonant converter apparatus and a method thereof, in particular to a converter apparatus including two or more resonant converters connected in parallel and a method thereof.

BACKGROUND

Nowadays, high power converter apparatus may employ two or more resonant converters connected in parallel to deliver high output current, which has advantages for maintenance, and the reliability of the apparatus may be improved by using parallel redundancy. Although a plurality of resonant converters connected in parallel may output the same current by using the symmetrical layout, it is difficult to obtain a completely symmetrical layout because there are some inherent differences between circuit layouts, and thus there is always current difference between the converters. It results in low efficiency and thermal loss of the apparatus, and the loss for the converter outputting high current may be large. The inventors hereof have recognized a need for a scheme keeping the balance of the output currents of the plurality of resonant converters connected in parallel.

SUMMARY

The present disclosure provides a resonant converter apparatus, which includes a plurality of resonant converters connected in parallel, and a control module outputting a pulse width modulation (PWM) control signal to the plurality of resonant converters, wherein the control module includes a voltage control loop and a circuit control loop, an output voltage of the plurality of resonant converters is connected to a voltage sensing end of the control module after being sensed; each output current of the plurality of resonant converters is connected to a current sensing end of the control module after being sensed; the voltage control loop of the control module compares the sensed output voltage with a predetermined reference voltage, and outputs a PWM control signal to one converter of the plurality of resonant converters according to the comparison result so that the output voltage of the one converter is equal to the predetermined reference voltage; the current control loop of the control module uses the sensed output current of the one converter as a reference current, compares the reference current with the sensed output current of each of the plurality of resonant converters other than the one converter, generates a frequency adjusting variable of PWM control signal for each of the plurality of converters other than the one converter based on the comparison result, and calculates the individual PWM control signal for each of the plurality of converters other than the one converter based on the PWM control signal outputted to the one converter and the frequency adjusting variable so that the output current of each of the plurality of converters other than the one converter is equal to the current outputted by the one converter.

Thus, a resonant converter apparatus according to the present disclosure can balance the outputted currents of the converters so as to improve the efficiency of the resonant converter apparatus and reduce the thermal loss.

The control module of a resonant converter apparatus according to the present disclosure may further include a time shift unit connected to the current control loop, which receives the PWM control signal calculated for each of the plurality of converters other than the one converter outputted by the current control loop, calculates a time difference between the PWM control signal for the one converter and the PWM control signal for each of the plurality of converters other than the one converter periodically, calculates a time shift as a dead time for the PWM control signal for each of the plurality of converters other than the one converter so that the time difference between the PWM control signal for the one converter and the PWM control signal for each of the plurality of converters other than the one converter is equal to a predetermined time difference, and outputs the time-shifted PWM control signal for each of the plurality of converters other than the one converter to the respective converter so as to reduce a voltage ripple.

The present disclosure further provides a method for a resonant converter apparatus, wherein the resonant converter apparatus includes a plurality of resonant converters connected in parallel and a control module, the method including the control module comparing an output voltage outputted from the plurality of resonant converters after being sensed with a predetermined reference voltage, outputting a PWM control signal to one of the plurality of resonant converters based on the comparison result so that an output voltage of the one converter is equal to the predetermined reference voltage; the control module using a sensed output current of the one converter as a reference current, and comparing the reference current with an output current of the plurality of converters other than the one converter after being sensed, generating a frequency adjusting variable of PWM control signal for each of the plurality of converters other than the one converter based on the comparison result, and calculating the individual PWM control signal for each of the plurality of converters other than the one converter based on the PWM control signal outputted to the one converter and the frequency adjusting variable so that the output current of each of the plurality of converters other than the one converter is the same as the current outputted by the one converter.

The method for a resonant converter apparatus according to the present disclosure may further include calculating a time difference between the PWM control signal for the one converter and the PWM control signal for each of the plurality of converters other than the one converter periodically by using the control module, calculating a time shift for the PWM control signal for each of the plurality of converters other than the one converter as a dead time so that the time difference between the PWM control signal for the one converter and the PWM control signal for each of the plurality of converters other than the one converter is equal to a predetermined time difference, and outputting the time-shifted PWM control signal for each of the plurality of converters other than the one converter to the corresponding converter so as to reduce a voltage ripple.

The resonant converters of a resonant converter apparatus according to the present disclosure may be connected in parallel so as to provide high power, and output the same current. The apparatus and method can achieve the current balance between the converters even if the converters have different arrangement. Furthermore, the present disclosure may ensure that the ripple of the voltage meets the specification for use based on the current balance by time-shifting the PWM control signal.

DRAWINGS

The present disclosure will be understood more fully from the following detailed description, taken in conjunction with the drawings in which.

DETAILED DESCRIPTION

Figure 1:
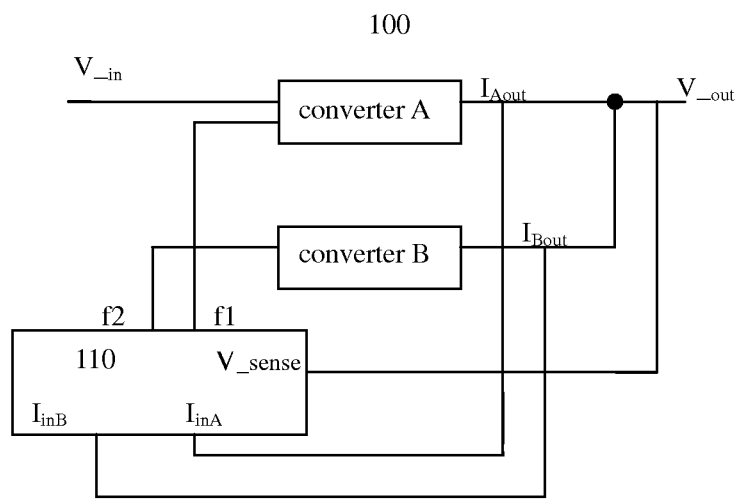
FIG. 1 is a schematic block diagram of the resonant converter apparatus in accordance with an embodiment of the present disclosure.

FIG. 1 is a schematic block diagram of the resonant converter apparatus 100 in accordance with an embodiment of the present disclosure. A converter apparatus 100 includes a resonant converter A and a resonant converter B, which receive an input voltage $V_{\_in}$ and output an voltage $V_{\_out}$. The converter A and the converter B respectively output the current $I_{Aout}$ and $I_{Bout}$. The switching frequency of a switching device may be adjusted in order to obtain the same output current at the converter A and the converter B. $I_{Aout}$ and $I_{Bout}$ are connected respectively to the terminal $I_{inA}$ and terminal $I_{inB}$ of a control module 110 after being sensed, and the output voltage $V_{\_out}$ is connected to the voltage sensing terminal V_sense of the control module 110. The control module 110, used as a PWM generator, outputs the control signals f1 and f2 to the converter A and the converter B so as to drive the switch devices of the converters A and B to adjust the output of the converters A and B so as to adjust the output currents of the converters A and B to be the same.

Figure 2:
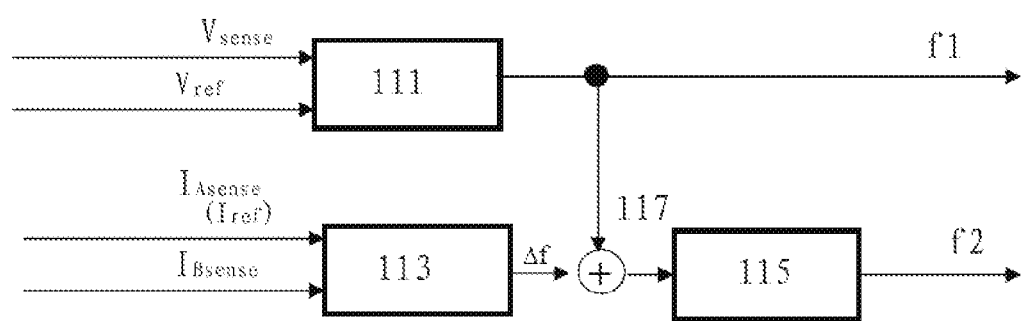
FIG. 2 is a schematic block diagram of the control module in accordance with the embodiment shown in FIG. 1.

FIG. 2 is a schematic block diagram of the control module 110. The control module 110 includes a voltage loop controller 111, a current loop controller 113, and a time-shift controller 115. The voltage loop controller 111 senses the output voltage $V_{out}$ of the converters A and B, compares the sensed voltage $V_{sense}$ with the reference voltage $V_{ref}$ and outputs PWM control signal f1 to, for example, the converter A so as to adjust the output voltage of the converter A to be equal to the reference voltage $V_{ref}$. The reference voltage $V_{ref}$ may be prestored in the control module 110, or may be changed by the user. The voltage loop controller can be formed by proportional-integral-derivative (PID) control loop.

The current loop controller 113 receives current $I_{Asense}$ and current $I_{Bsense}$, which are obtained by sensing output currents $I_{Aout}$ and $I_{Bout}$ of the converters A and B. The current loop controller 113 then uses $I_{Asense}$ sensed from the output current of the converter A as the reference current $I_{ref}$. The current loop controller 113 generates a variable $\Delta f$ indicating the frequency shift based on the difference between $I_{ref}$ and $I_{Bsense}$ of the converter B. The adder 117 calculates the sum of the variable $\Delta f$ and f1 to obtain f2. If $I_{Bsense}$ is smaller than $I_{ref}$, i.e., the output current of the converter B is smaller than the output current of the converter A, the variable $\Delta f$ will lower the switching frequency of the switch device of the converter B so as to increase the gain, and therefore boost up the output voltage to output higher current. On the other hand, if $I_{Bsense}$ is larger than the reference current $I_{ref}$, i.e., the output current $I_{Bout}$ of the converter B is larger than the output current $I_{Aout}$ of the converter A, the variable $\Delta f$ will increase the switching frequency of the switch device of the converter B so as to reduce the output current. Therefore, the balance between the output currents of the converter A and converter B is ensured. That is to say, the output currents of them are the same.

The current loop controller 113 may be implemented by using PID control loop. Certainly, the aforesaid process for calculating f1 and f2 may be performed by calculating the PWM control signal outputted to the converter B according to the output voltage, and then using the output current of the converter B as the reference value to calculate the PWM control signal to be outputted to the converter A.

After the aforesaid adjustment of the switching frequency, the switching frequencies f1 and f2 of the converters A and B may be different, which may render a relatively large ripple in their output voltage. Thus, as shown in FIG. 2, the time-shift controller 115 is introduced so that the PWM control signal f2 has a time shift $\Delta t$ with respect to f1, which may reduce the ripple of the output voltage. The time-shift controller 115 is connected to the current loop controller 113 to receive f2 outputted therefrom.

More specifically, the time-shift controller 115 detects the time difference between PWM control signals f1 and f2 periodically (e.g., one or more switching periods) by, for example, detecting the difference between the rising edges of those control signals, increases the dead time of f2 according to the predetermined time difference between f1 and f2, wherein the dead time corresponds to the time shift $\Delta t$. Accordingly, the time difference between f1 and f2 is the predetermined time difference, and the voltage ripple is reduced.

It is seen from the aforesaid description that the current control loop and the voltage control loop of the control module 110 balance the output currents of the converter A and the converter B. If the voltage ripple does not meet the requirement, the time-shift controller 115 may be introduced to reduce the ripple. Nonetheless, the time-shift controller 115 is not necessary for balancing the output currents of the converters connected in parallel.

In addition, the switching frequencies of the converter A and converter B may be different. This is because they do not need to keep the same phase relationship. On the other hand, the difference between the switching frequencies of the converter A and converter B should be limited within a certain range.

Figure 3:
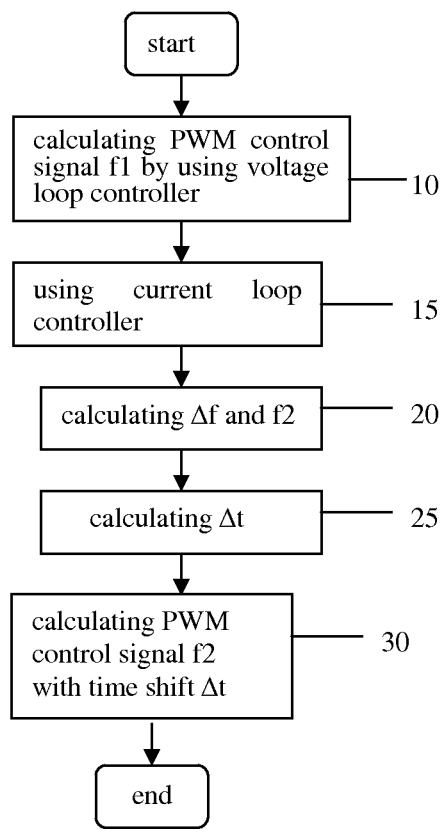
FIG. 3 is an operation flowchart of the control module shown in FIG. 2.

FIG. 3 is an operation flowchart of the control module shown in FIG. 2. The operation of the control module may be understood with reference to the aforesaid explanation for FIG. 2. The control module 110 firstly uses the voltage loop controller to obtain the PWM control signal f1 for the converter A at step 10, and then the current loop controller uses the sensed value of the output current of the converter A as the reference current to obtain the difference between the sensed value of the output current of the converter A and the sensed value of the output current of the converter B at step 15, and calculates the variable $\Delta f$ according to that difference (step 20) so as to obtain f2.

At step 25, the time-shift controller 115 calculates the time shift $\Delta t$ between the control signals of the converter B and the converter A so as to obtain the PWM control signal f2 which has been time-shifted to be outputted to the converter B (step 30). If the ripple voltage meets the requirement, the step 25 may be omitted.

When the converter apparatus includes more than two converters, the method for calculating the PWM control signals for the individual converters is similar to the aforesaid method, i.e., calculating a PWM control signal for one converter using the voltage loop controller according to the sensed value of the output voltage, using the sensed value of the output current of this converter as the reference current to calculate PWM control signals of other converters, and then, if necessary, calculating the time shift by using the time shift controller, and transmitting the PWM control signals of other converters which have been time-shifted by the time-shift controller to the respective switch devices thereof so as to achieve the current balance scheme and reduce the voltage ripple.

Figure 4:
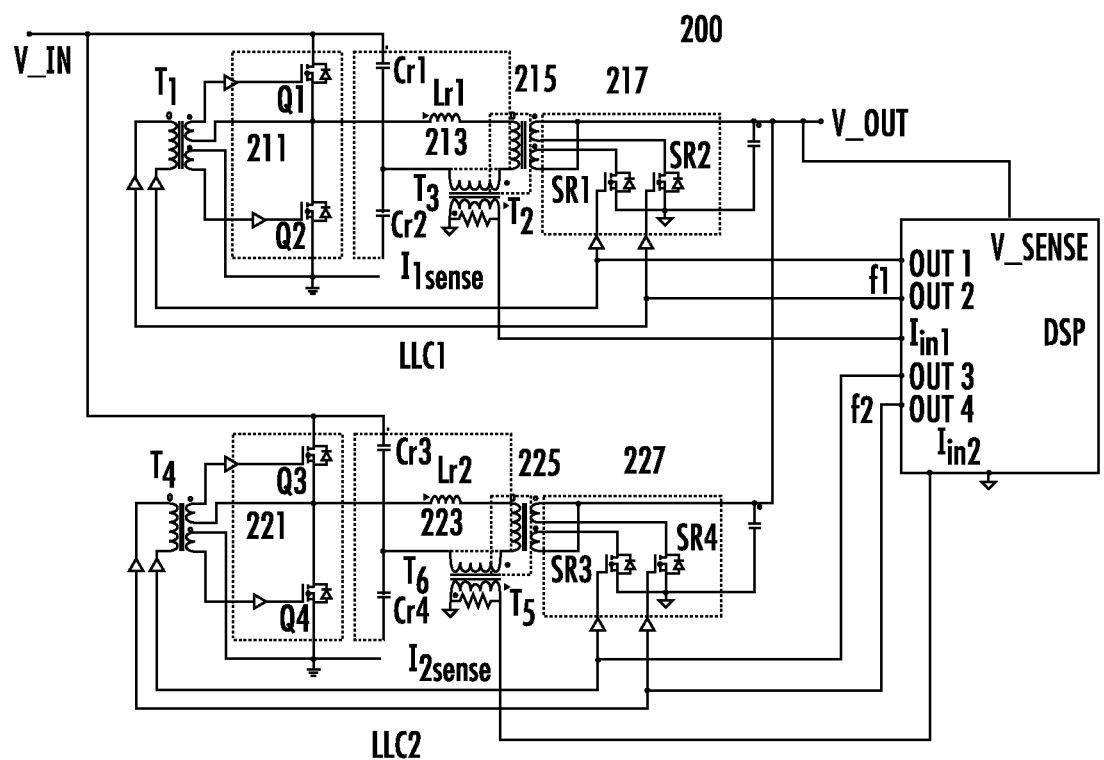
FIG. 4 is a circuit schematic diagram of an embodiment having two LLC converters connected in parallel.

FIG. 4 is a circuit schematic diagram of an embodiment having two LLC converters connected in parallel. As shown in FIG. 4, the converter apparatus 200 includes LLC half-bridge resonant AC-DC converters LLC1 and LLC2, and the digital signal processor (DSP) as the controller (or using other suitable device(s) as the controller). DSP includes PID voltage control loop and current control loop. The converters LLC1 and LLC2 have the same circuit arrangement, wherein the converter LLC1 includes switching unit 211, resonant unit 213, transformer unit 215, and rectifying unit 217, and the resonant unit 213 includes Cr1 (Cr2), Lr1 and the magnetic inductance of the transformer unit. The output voltage V_out of the converter LLC1 is outputted to the V_sense terminal of DSP after being sensed, and the output currents I1 and I2 of the switching units 211 and 221 of the converters LLC1 and LLC2 are sensed by the transformers $T_3$ and $T_6$ to output $I_{1sense}$ and $I_{2sense}$, which are inputted respectively into $I_{in1}$ and $I_{in2}$ of DSP.

The operation of DSP is similar to the operation of the control module as shown in FIG. 3. In particular, DSP firstly compares the sensed voltage signal with the reference voltage $V_{ref}$ stored therein. The reference voltage $V_{ref}$ is the predetermined output voltage of the converter apparatus. Based on the comparison result between the predetermined output voltage and the currently sensed output voltage, DSP outputs a PWM control signal to the converter A for controlling the switch device(s) 211 of the converter A and the switch device(s) of the rectifying unit 217.

In order to balance the current outputs of the converter LLC1 and the converter LLC2, DSP uses the sensed current $I_{1sense}$ of the output current of the converter LLC1 as the reference value, compares it with the sensed current $I_{2sense}$ of the output current of the converter LLC2 to obtain the variable $\Delta f$ for adjusting the PWM control signals outputted to the respective switches of the converter LLC2. If the output current of the converter LLC2 is lower than the output current of the converter LLC1, the switching frequency of the PWM control signal outputted to the converter LLC2 will be reduced with respect to the switching frequency of PWM control signal outputted to the converter LLC1 until the output current of the converter LLC2 is equal to the output current of the converter LLC1.

The ripple may be generated on the output voltage due to the different switching frequencies controlled by the PWM control signals of the converter LLC1 and the converter LLC2. In order to reduce or even eliminate the ripple, the time-shift control unit in DSP calculates the time shift $\Delta t$ for the PWM control signal of the converter LLC2 with respect to the PWM control signal of the converter LLC1.

In the present embodiment, it is desired to keep the time difference between the switching frequencies of the converter LLC1 and the converter LLC2 equal to the predetermined time difference by adjusting the time shift $\Delta t$, such as equal to one fourth period of the switching frequency of the converter LLC1. As described above, DSP calculates f1 and f2 by using PID voltage control loop and current control loop. In the present embodiment, f2 is calculated by f1 and $\Delta f$. In order to calculate the time shift, DSP detects the time difference between the rising edges of two PWM signals, i.e., f1 and f2. This time difference may be measured and calculated by the internal counter. After calculating the time difference, DSP calculates the dead time for compensation to adjust the time difference between f1 and f2 to be equal to the aforesaid predetermined time difference, and the compensated dead time corresponds to $\Delta t$. In the present disclosure, the process for adjusting the time difference between PWM signals by calculating the time shift $\Delta t$ is called as synchronization process. It is not necessary to perform the synchronization process at each switching period, which may be performed periodically by using several switching periods as a fixed period.

Figure 6:
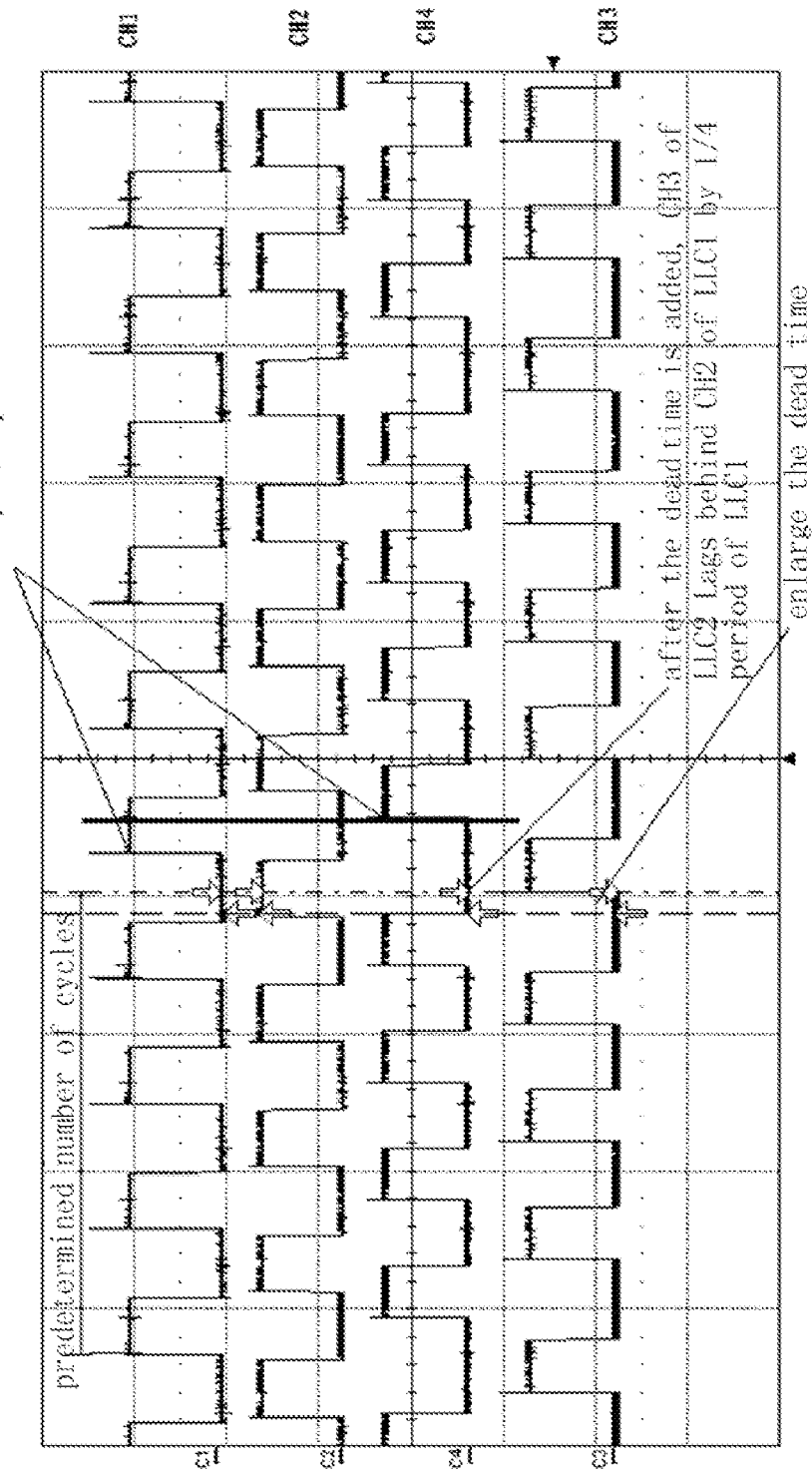
FIG. 6 is a schematic diagram illustrating the adjustment of the time shift in the embodiment of FIG. 4.

FIG. 6 is a schematic diagram illustrating the time shift. It shows two pairs of PWM signals, wherein CH1 and CH2 are the PWM signals of LLC1, which are obtained by the voltage control loop; and CH3 and CH4 are the PWM signals of LL2, which are obtained by the current control loop. As shown in FIG. 6, the frequency of the signal CH1 and that of the signal CH2 are different, and thus the time difference between the two signals keeps change. In FIG. 6, the synchronization period is set as each four LLC1 switching periods, i.e., adjusting the time shift $\Delta t$ of the switching control signal f2 of LLC2 every four LLC1 switching periods, so that the PWM signal of LLC2 lags one fourth period behind that of LLC1 after the dead time corresponding to $\Delta t$ is introduced. Accordingly, the ripple of the output voltage is reduced by synchronizing the switching control signals of LLC1 and LLC2 periodically.

Figure 5:
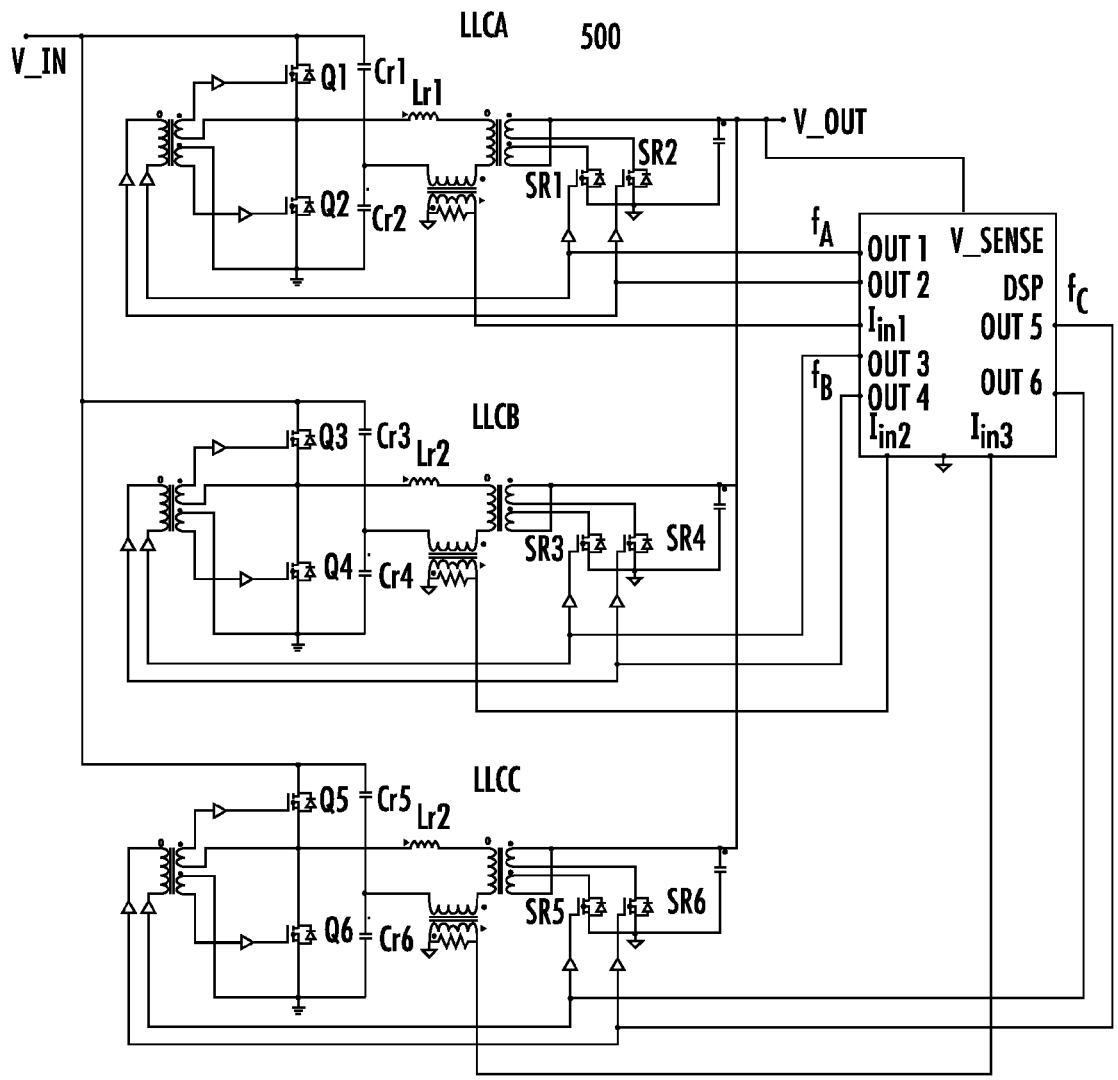
FIG. 5 is a circuit schematic diagram of an embodiment having more than two LLC converters connected in parallel.

FIG. 5 is a circuit schematic diagram of an embodiment of a converter apparatus including three LLC converters connected in parallel. The circuit layout and the working principle of the converter apparatus are similar to the converter apparatus shown in FIG. 4. DSP firstly calculates PWM control signal of one converter based on the output voltage, and uses the sensed outputted current of that one converter as a reference value to calculate PWM control signal outputted to other two converters.

In the embodiment as shown in FIG. 5, DSP firstly obtains PWM control signal $f_A$ outputted to the converter LLCA based on the reference voltage as described above, uses the sensed value of the output current of the converter A as the reference current, calculates variables $\Delta f_B$ and $\Delta f_C$ that indicate respectively the frequency shifts of PWM control signal $f_B$ of the converter LLCB and $f_C$ of the converter LLCC with respect to $f_A$ by comparing the reference current with the sensed currents of the converter LLCB and the converter LLCC. Accordingly, the output current of the converter B and that of the converter C are the same as that of the converter A by using the calculated $f_B$ and $f_C$. After that, the time shift unit in DSP calculates time shift $\Delta t_B$ and $\Delta t_C$ respectively for PWM control signals $f_B$ and $f_C$ outputted to the respective converters LLCB and LLCC, and outputs the time-shifted $f_B$ and $f_C$ to the switching devices of the converter B and the converter C so as to reduce the voltage ripple.

Although the present invention has been described with reference to specific details of certain embodiments thereof, those skilled in the art would readily appreciate that the present invention may be implemented by other means without departing from the spirit of the present invention. For instance, the converters of the present invention may be selected according to the requirement, usually including various kinds of converters, such as, AC-DC, DC-AC, AC-AC and DC-DC converter. The controller may be constructed in an alternative matter as required, such as using analog circuit, microcontroller (MCU), digital signal processor (DSP), etc. Therefore, it should be understood by those skilled in the art that the present application is not limited by the specific description set forth herein, but rather only by the appended claims.

The invention claimed is:

1. A resonant converter apparatus comprising:
   a plurality of resonant converters connected in parallel; and
   a control module configured to output a pulse width modulation (PWM) control signal to the plurality of resonant converters, wherein:
   the control module comprises a voltage control loop and a current control loop;
   a voltage sensing end of the control module is configured to receive a sensed output voltage of the plurality of resonant converters;
   a current sensing end of the control module is configured to receive a sensed output current of each of the plurality of resonant converters;
   the voltage control loop of the control module is configured to compare the sensed output voltage with a predetermined reference voltage, and output a PWM control signal to one resonant converter of the plurality of resonant converters according to a voltage comparison result so that an output voltage of the one resonant converter is equal to the predetermined reference voltage; and
   the current control loop of the control module is configured to use the sensed output current of the one resonant converter as a reference current, compare the reference current with the sensed output current received from each of the plurality of resonant converters other than the one resonant converter, generate a frequency adjusting variable of the PWM control signal for each of the plurality of resonant converters other than the one resonant converter based on the current comparison result, and calculate the PWM control signal for each of the plurality of resonant converters other than the one resonant converter based on the PWM control signal provided to the one resonant converter and the frequency adjusting variable to adjust the output current of each of the plurality of resonant converters other than the one resonant converter to be equal to the output current of the one resonant converter.

2. The resonant converter apparatus of claim 1, wherein the control module further comprises a time shift unit connected to the current control loop, the time shift unit configured to receive the PWM control signal calculated for each of the plurality of resonant converters other than the one resonant converter and output by the current control loop, periodically calculate a time difference between the PWM control signal for the one resonant converter and the PWM control signal for each of the plurality of resonant converters other than the one resonant converter, calculate a time shift as a dead time for the PWM control signal for each of the plurality of resonant converters other than the one resonant converter so that the time difference between the PWM control signal for the one resonant converter and the PWM control signal for each of the plurality of resonant converters other than the one resonant converter is equal to a predetermined time difference, and output a time-shifted PWM control signal for each of the plurality of resonant converters other than the one resonant converter to each respective resonant converter so as to reduce a ripple of the output voltage.

3. The resonant converter apparatus of claim 2, wherein the predetermined time difference is one-fourth of a period of the PWM control signal for the one resonant converter.

4. The resonant converter apparatus of claim 2, wherein the plurality of resonant converters are LLC converters.

5. The resonant converter apparatus of claim 4, wherein the plurality of resonant converters each include a switching unit, a resonant unit, a transformer unit and a rectifying unit, a current sensing terminal of the controle module is configured to receive a sensed output current of the resonant unit as the output current of the plurality of resonant converters, and the control module is configured to output the PWM control signal to the switching unit and the rectifying unit of the corresponding one of the plurality of resonant converters for controlling switching devices of the switching unit and the rectifying unit.

6. The resonant converter apparatus of claim 1, wherein the current control loop is configured to generate the frequency adjusting variable to reduce the frequency of the PWM control signal provided to any one of the plurality of resonant converters other than the one resonant converter when the sensed output current of the any one of the plurality of resonant converters other than the one resonant converter is less than the reference current, and generate the frequency adjusting variable to increase the frequency of the PWM control signal provided to any one of the plurality of resonant converters other than the one resonant converter when the sensed output current of the any one of the plurality of resonant converters is larger than the reference current.

7. The resonant converter apparatus of claim 1, wherein the voltage control loop is a PID control loop, and the current control loop is a PID control loop.

8. The resonant converter apparatus of claim 1, wherein the control module comprises a DSP.

9. The resonant converter apparatus of claim 1, wherein the plurality of resonant converters are any of an AC-DC converter, a DC-AC converter, and an AC-AC converter.

10. A method for controlling a resonant converter apparatus, the apparatus comprising a plurality of resonant converters connected in parallel and a control module, the method comprising:
   comparing a sensed output voltage received from the plurality of resonant converters with a predetermined reference voltage;
   outputting a PWM control signal to one resonant converter of the plurality of resonant converters based on the voltage comparison result so that an output voltage of the one resonant converter is equal to the predetermined reference voltage;
   using a sensed output current of the one resonant converter as a reference current;
   comparing the reference current with a sensed output current of each of the plurality of resonant converters other than the one resonant converter;
   generating a frequency adjusting variable of the PWM control signal for each of the plurality of resonant converters other than the one resonant converter based on the current comparison result; and
   calculating the PWM control signal for each of the plurality of resonant converters other than the one resonant converter based on the PWM control signal provided to the one resonant converter and the frequency adjusting variable to adjust the output current of each of the plurality of resonant converters other than the one resonant converter to be equal to the current output by the one resonant converter.

11. The method of claim 10, further comprising:
periodically calculating a time difference between the PWM control signal for the one resonant converter and the PWM control signal for each of the plurality of resonant converters other than the one resonant converter;
calculating a time shift as a dead time for the PWM control signal for each of the plurality of resonant converters other than the one resonant converter so that the time difference between the PWM control signal for the one resonant converter and the PWM control signal for each of the plurality of resonant converters other than the one resonant converter is equal to a predetermined time difference; and
outputting a time-shifted PWM control signal for each of the plurality of resonant converters other than the one resonant converter to each respective resonant converter so as to reduce a voltage ripple.

12. The method of claim 11, wherein the predetermined time difference is one-fourth of a period of the PWM control signal for the one resonant converter.

13. The method of claim 11, wherein the plurality of resonant converters are LLC converters, each resonant converter includes a switching unit, a resonant unit, a transformer unit and a rectifying unit, and an output current of the resonant unit is the output current of the plurality of resonant converters, the method further comprising:
outputting, from the control module, the PWM control signal to the switching unit and the rectifying unit of each corresponding one of the plurality of resonant converters for controlling switching devices of the switching unit and the rectifying unit.

14. The method of claim 10, wherein generating the frequency adjusting variable of the PWM control signal for each of the plurality of resonant converters other than the one resonant converter based on the comparison result comprises generating the frequency adjusting variable to reduce the frequency of the PWM control signal provided to any one of the plurality of resonant converters other than the one resonant converter when the sensed output current of the any one of the plurality of resonant converters other than the one resonant converter is less than the reference current, and generating the frequency adjusting variable to increase the frequency of the PWM control signal provided to the any one of the plurality of resonant converters other than the one resonant converter when the sensed output current of the any one of the plurality of resonant converters other than the one resonant converter is larger than the reference current.

15. The method of claim 10, wherein the control module comprises a DSP.

16. The method of claim 10, wherein the plurality of resonant converters are any of an AC-DC converter, a DC-AC converter, and an AC-AC converter.

* * * * *